(12) United States Patent
Hinch et al.

(10) Patent No.: US 7,972,426 B2
(45) Date of Patent: Jul. 5, 2011

(54) PRINTED SECURITY MARK

(75) Inventors: Garry Dale Hinch, Salem, OR (US);
Herbert T. Etheridge, III, Corvallis, OR (US); James William Stasiak, Lebanon, OR (US); Timothy Dean Strecker, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 953 days.

(21) Appl. No.: 11/801,233

(22) Filed: May 9, 2007

(65) Prior Publication Data

US 2008/0276817 A1 Nov. 13, 2008

(51) Int. Cl.
*C09D 11/00* (2006.01)
(52) U.S. Cl. .................. 106/31.32; 106/31.64
(58) Field of Classification Search ........... 106/31.32, 106/31.64
See application file for complete search history.

(56) References Cited

U.S. PATENT DOCUMENTS

| | | | |
|---|---|---|---|
| 6,576,155 | B1 | 6/2003 | Barbera-Guillem |
| 6,786,954 | B1 * | 9/2004 | Lee et al. .............. 106/31.13 |
| 7,138,009 | B2 * | 11/2006 | Auslander ............. 106/31.32 |
| 7,141,103 | B2 * | 11/2006 | Auslander et al. ..... 106/31.32 |
| 7,192,474 | B2 * | 3/2007 | Auslander et al. ..... 106/31.32 |
| 2003/0177941 | A1 | 9/2003 | Barbera-Guillem |
| 2003/0180482 | A1 | 9/2003 | Narita et al. |
| 2004/0220298 | A1 | 11/2004 | Kozee et al. |
| 2004/0233465 | A1 * | 11/2004 | Coyle et al. .............. 358/1.9 |
| 2005/0279248 | A1 | 12/2005 | Auslander |
| 2006/0249951 | A1 | 11/2006 | Cruikshank |
| 2006/0293409 | A1 | 12/2006 | Sanchez |
| 2008/0277626 | A1 * | 11/2008 | Yang et al. ............ 252/301.36 |

FOREIGN PATENT DOCUMENTS

WO WO2007015261 2/2007

* cited by examiner

*Primary Examiner* — Jerry Lorengo
*Assistant Examiner* — Veronica Faison Gee

(57) ABSTRACT

Embodiments of a printed security mark and a process are disclosed.

19 Claims, 2 Drawing Sheets

PRINTED SECURITY MARK

BACKGROUND

Security marks may be used to verify the authenticity of a document, such as a check, academic transcript, or stock certificate. It may be desirable to provide on the document a printed security mark that is difficult to counterfeit or decipher.

DETAILED DESCRIPTION OF THE DRAWINGS

Figure 1:
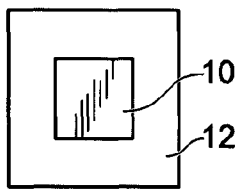
FIG. 1 is a schematic view of one example embodiment of a printed security mark utilizing components activated by light in the visible wavelength range.

FIG. 1 is a schematic view of one example embodiment of a printed security mark 10 utilizing components activated by light in the visible wavelength range such that security mark 10 is visible to the naked eye. Security mark 10 may be printed on a security item 12, such as a check. In other embodiments, security mark 10 may be printed on a tag (not shown) that may be secured to a security item, such as a shipping container (not shown).

Figure 2:
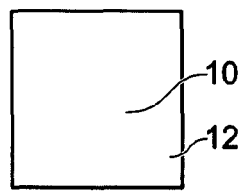
FIG. 2 is a schematic view of one example embodiment of a printed security mark utilizing components activated by light in the non-visible wavelength range.

FIG. 2 is a schematic view of one example embodiment of a printed security mark 10 utilizing components activated by light in the non-visible wavelength range such that the security mark 10 is not visible to the naked eye. This type of security mark may be referred to as a covert or hidden security mark because light outside the visible light wavelength range, such as infrared and/or ultraviolet light, may be utilized to activate light-activated components of the security mark 10 in order for the mark 10 to be viewed. In other words, a covert security mark 10 may utilize a detection device, rather than the naked eye, to view the spectral features of security mark 10.

Figure 3:
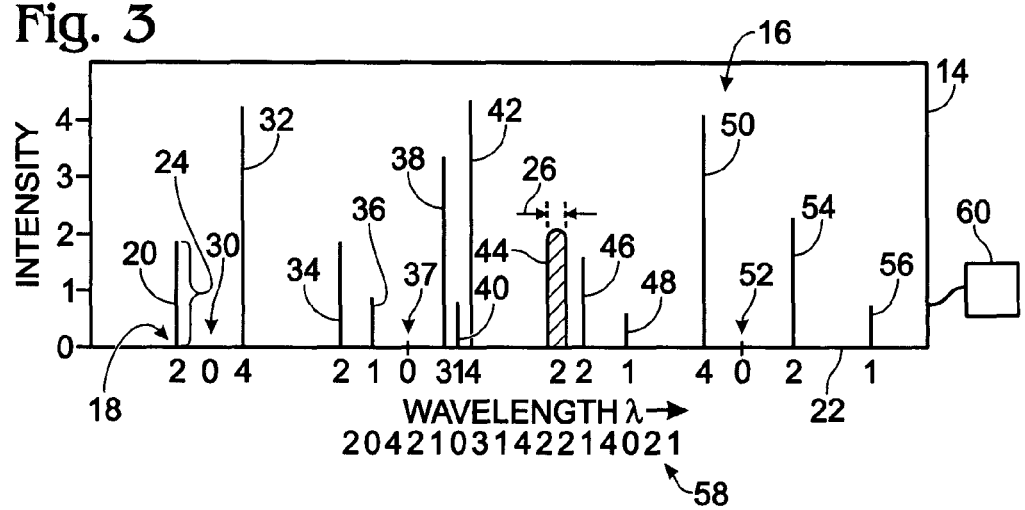
FIG. 3 is a schematic view of a data encoding of spectral information for one example security mark.

FIG. 3 is a schematic view of a data encoding 14 of spectral information 16 for one example security mark 10 (see FIG. 2). Spectral information 16 may include wavelength information such as the position 18 of a wavelength peak 20 along a wavelength axis 22. Spectral information 16 may also include intensity information such as an amplitude 24 of a wavelength peak 20 extending upwardly from axis 22. Spectral information 16 may further include peak range information such as a width 26, also referred to as a line width, of a peak 44. In other embodiments, other types of spectral information 16 may be included within security mark 10.

The spectral information 16 shown in FIG. 3 includes sixteen peak locations of interest, shown from left to right on axis 22, as peak locations 18, 30, 32, 34, 36, 37, 38, 40, 42, 44, 46, 48, 50, 52, 54 and 56. In the embodiment shown in FIG. 3, peak locations 30, 37 and 52 do not include a wavelength peak. The peak at location 18 has an amplitude 24 of two units, i.e., an intensity of two. Similarly, peak location 30 has a peak of an intensity of zero, i.e., no peak present. Peak location 32 has a peak of an intensity of four. Peak location 34 has a peak of an intensity of two. The remaining peak locations have peaks with an intensity, respectively, of 1-0-3-1-4-2-2-1-4-0-2-1. Accordingly the spectral information 16 of the embodiment shown in FIG. 3 gives a "fingerprint" 58, i.e., an encoded key of "2042103142214021," which represents the amplitude of each peak at all encoded peak locations along wavelength axis 22. This fingerprint 58 may be stored in a memory system such as a computer 60, and utilized as a key for the comparison of spectral information received from a security item for which the authenticity is to be determined. In other embodiments the peaks may be presented downwardly and/or as frequency rather than wavelength.

Figure 4:
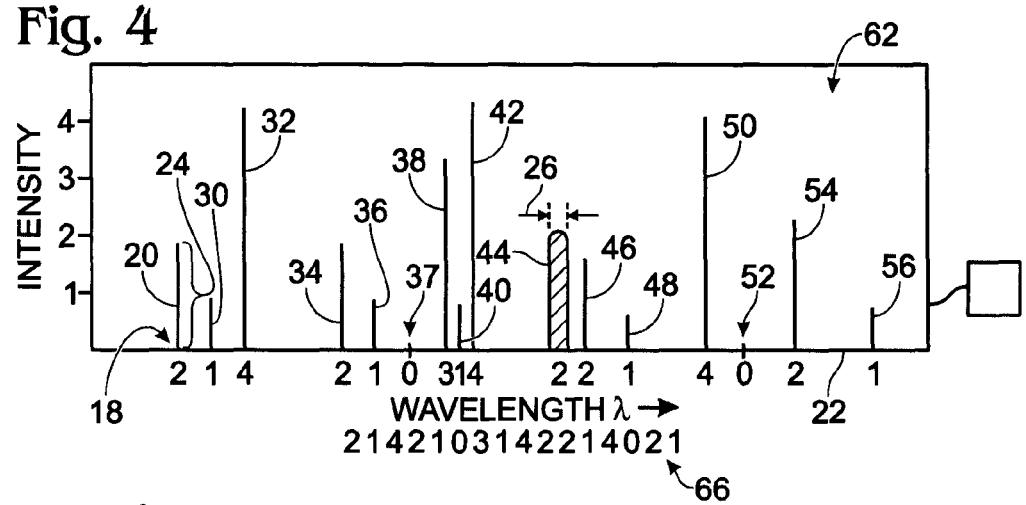
FIG. 4 is a schematic view of a data encoding of spectral information for another example security mark.

FIG. 4 is a schematic view of a data encoding of spectral information 62 for another example security mark 10. In this data encoding the spectral information 62 may be analyzed at peak locations 18, 30, 32, 34, 36, 37, 38, 40, 42, 44, 46, 48, 50, 52, 54 and 56 having a fingerprint 66 of "2142103142214021." Accordingly, second peak location 30 has a peak amplitude of one unit whereas the key fingerprint 58 of FIG. 3 has a peak amplitude of zero units at peak location 30. When comparing fingerprint 66 of the security item of FIG. 4 to be authenticated, computer 60 will determine that fingerprint 66 does not match key fingerprint 58 and will therefore determine that security item bearing spectral information 62 is not authentic. Accordingly, peak locations, peak amplitudes, peak widths, or other types of encoded light-activated spectral information 16 may be utilized to determine the authenticity of a security item 12.

Figure 5:
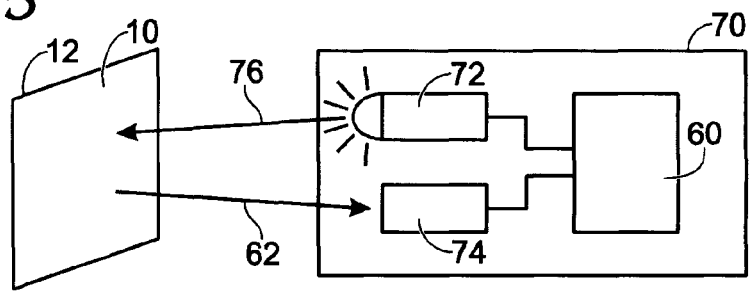
FIG. 5 shows one example embodiment of an apparatus for reading a security mark.

FIG. 5 shows an apparatus 70 for determining the authenticity of a security item 12. Apparatus 70 may include a light source 72 such as an infrared or an ultraviolet light source, and a light detection device 74, such as a spectroscopic device, both connected to and controlled by computer 60. Device 74 may read the emission, absorption, or Raman light information, also referred to spectral information 16, produced by security mark 10 when light 76 is emitted to security mark 10 from light source 72. The steps of determining the authenticity of a security item 12 will now be described.

To determine the authenticity of security mark 10, light 76 is emitted to security mark 10 from light source 72. The light impinges on light activated components of security mark 10 such that the light activated components produce spectral information 62 (see FIG. 4) that may be detected by detection device 74. Detection device 74 receives the spectral information 62 from security mark 10 and compares the spectral information 62 with the data fingerprint, i.e., spectral information 16, stored in the memory of computer 60. If the received encoded data information of spectral information 62 matches the stored encoded data information of spectral information 16, to the precision specified by computer 60, then the received spectral information 62 is deemed a match and the security mark bearing spectral information 62 is deemed to be authentic. If the received encoded data information of spectral information 62 does not match the stored encoded data information of spectral information 16, to the precision specified, then the received spectral information 62 is not deemed a match and the security mark bearing spectral information 62 is deemed to be a counterfeit. In one example embodiment, a mark is deemed to be authentic if individual elements of the spectral information of the detected response pattern are each within ten percent of a value of a corresponding individual element of a stored spectral information pattern. Of course, other criteria and/or other precision may be chosen to determine the authenticity of a security mark.

Figure 6:
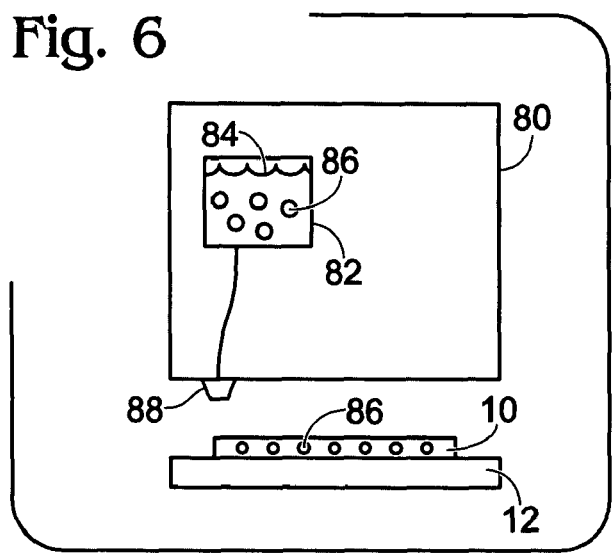
FIG. 6 shows one example embodiment of an apparatus for printing a security mark.

FIG. 6 shows one example embodiment of an apparatus 80 for printing a security mark 10 on a security item 12. Apparatus 80 may include an ink container 82 that contains an ink 84 including light-activated components 86, also referred to as photo-active elements or components, therein. "Light-activated" may be defined as particles, such as nanocrystals or nanoparticles, for example, that produce spectral features when a particular light is illuminated on the light-activated components of printed security mark 10.

Apparatus 80 may be any suitable printing device, such as an inkjet printer. Ink 84, including light-activated components 86 may be printed through a nozzle or nozzles 88 onto security item 12 to define security mark 10 including light-activated components 86 therein. Accordingly, light-activated components 86 generally have a small size so as to be ejected through nozzles 88 onto security item 12, such as 10 nanometers or less for printing though small nozzles 88, and hundreds of nanometers for printing through larger nozzles 88. Placement of light-activated components 86 onto security item 12 by use of a printing device 80 may allow precise and cost effective placement of the light-activated components 86.

Figure 7:
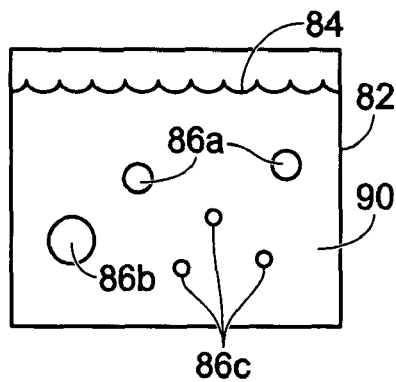
FIG. 7 shows one example embodiment of an ink for printing a security mark.

FIG. 7 shows one example embodiment of an ink 84 including a plurality of light-activated components 86 therein. Use of a plurality of different types of light-activated components 86, such as 86a, 86b, 86c and the like, in a single ink 84, may allow the more efficient creation of the barcode-like features of spectral information 16 (see FIG. 3) including multiple types of spectral features, such as multiple peak locations and intensities, without utilizing multiple ink cartridges and/or multiple print passes to create a security mark 10.

Ink 84 may be utilized to form security mark 10 wherein security mark 10 may be described as a selectively readable security mark. "Selectively readable" may be defined as a mark, such as a covert or an overt mark, that can be detected only when light having a particular property, such as a particular wavelength, is emitted to the security mark, such that the mark 10 emits particular response spectral information 16 that may be detected by the use of a detector 74 (see FIG. 5) and/or by the naked eye in the case of a mark having overt spectral features. For example, in the embodiment of a mark having overt spectral features, a detector could be used to measure absorption or emission intensity.

The photo-active components 86 of ink 84 may be in a solvent 90 and may produce spectral features 16 when a particular light 76 (see FIG. 5) is illuminated on the printed security mark 10. In other words, the photo-active components 86 may interact with light 76 (see FIG. 5) when a particular light, i.e., a light having particular properties such as a particular wavelength, is illuminated on the security mark 10. The interaction of the photo-active components 86 with the light 76 may result in absorption, reflection, scattering, such as Raman scattering, or another type of light interaction. In the case of a reflective photo-active material, the material may reflect light in the non-visible wavelength range wherein the reflected light can be detected by a detector 74. In the case of an absorptive photo-active material 86, the material may be fluorescent such that the security mark 10 will produce an emission spectrum of spectral information 16 in the non-visible wavelength range that can be detected by detector 74.

As shown in FIG. 3, spectral information 16 may include the presence of peaks at particular wavelengths which may correspond to the light-activated components 86 utilized in ink 84. In other words, the light-activated components 86 may provide an emission spectrum "fingerprint" 66 that may be matched to an emission spectrum "fingerprint" 58 on file, wherein computer 60 may perform a comparison algorithm to verify the authenticity of the printed security mark 10. Moreover, the intensity of the individual peaks, i.e., the height 24 of the individual peaks, may be dependent on the amount of light-activated component 86 or components present in the ink 84 utilized to print the security mark 10. Accordingly, by adjusting the composition of the light-activated components 86a, 86b, 86c and the like, utilized in ink 84, and by adjusting the amount of each of the light-activated components 86a, 86b, 86c and the like, in the ink, a unique security code, i.e., a unique emission spectrum "fingerprint" 66, can be detected by a detector 74, and is not easily counterfeited.

As stated above, "light-activated" may be defined as light-activated components 86 in a solvent 90, such as nanocrystals or nanoparticles, for example, that produce spectral features or information 16 when a particular light 76 (see FIG. 5) is illuminated on the printed security mark 10. In other words, an ink 84 including one or more light-activated components 86a, 86b, 86c, or the like, may be used to create wavelength specific spectral information 16 for security printing. The resulting complex set of spectral information 16 may make the security mark very difficult to duplicate.

Figure 8:
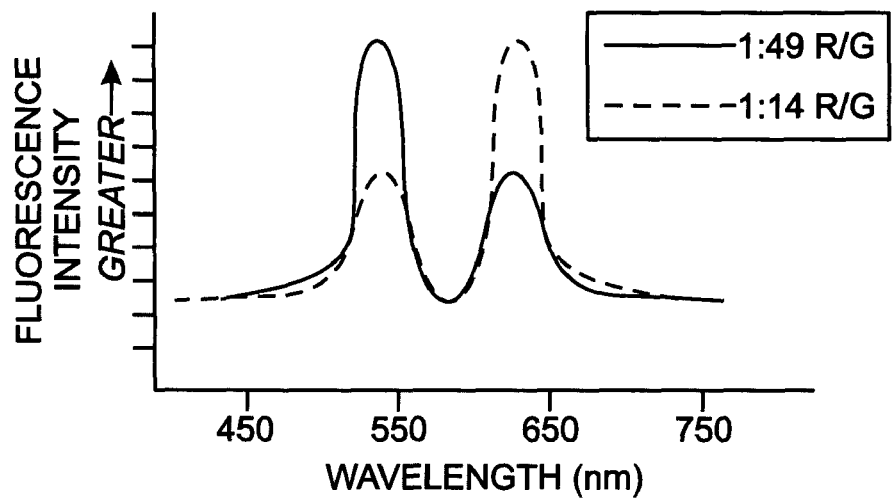
FIG. 8 shows spectral information for two example embodiments of ink.

FIG. 8 shows a fluorescence spectrum for one example ink 84 including a mixture of quantum dots with differing emission wavelengths. The ink included red, 625 nm, and green, 555 nm, emitting quantum dots and had a dot concentration of 5.0 mg/ml. The solvent 90 utilized was a solution of 12% HEP [1-(2-hydroxyethyl)-2-pyrrolidone] in water. The quantum dot solution provided a final quantum dot concentration in the ink 84 of 2.0 mg/ml. The ratio of red to green quantum dots used in two example inks was 1:49 and 1:14. Emission spectra for the two ink samples described was collected on a PTI Model QM/4 fluorimeter. Both spectra show emission peaks for the two distinct sizes of quantum dots, and the fluorimeter distinguished between the two printed samples which contained different ratios of red/green quantum dots (the solid line represents the 1:49 red/green ink and the dash line represents the 1:14 red/green ink). These spectra demonstrate the concept of a two-bit security mark 10, i.e., a security mark including more than one variable. In particular, the spectral information 16 of the ink 84 can be varied by changing the material content, i.e., by changing the types of components 86a, 86b, 86c and the like, in ink 84. By adding a variety of components 86a, 86b, 86c, and the like, to ink 84, multiple levels or types of data, encoded as the presence and/or absence of spectral features at specific wavelengths, may be achieved. Such multiple levels or types of data may be used to provide a security mark 10 that is very difficult to counterfeit. Additionally, the intensity, i.e., the amount of each of components 86a, 86b, 86c, and the like, may be varied, which may result in a change in the amplitude 24 (see FIG. 3) of spectral peaks associated with each component, to provide even more variables with which to adjust the resulting spectral information 16 of ink 84.

In another embodiment, components 86 of ink 84 may be carbon nanotubes that may provide spectral information 16 by absorption or fluorescence. In another example, phosphors may be utilized as components 86 of ink 84. In particular embodiments $YVO_4:Eu^{3+}$ initial nanoparticles under 293 nm and 468 nm excitation may both provide peaks at wavelengths of approximately 590 nm and 615 nm. $Er^{3+}$ doped $Y_2O_3$ may also provide spectral information 16 including a variety of absorption and emission peaks. In one embodiment, CdSe:ZnS quantum dots in a solvent of toluene resulted in emission wavelength peaks at 500 nm, 550 nm, and 625 nm wavelengths for light emission wavelengths of 365 nm, 360 nm and 469 nm, respectively. In another embodiment, components 86 may be molecules such as a styrene/butadiene rubber and/or cyclohexanone molecules, which may produce a Raman shift. In yet another embodiment, components 86 may be composite materials such as a composite particle having a reference dye core with an inorganic shell, such as a silica ($SiO_2$) surface outer shell. The width of such composite materials may be in a range of 50 nm to 2 μm. Components 86 may also be a nanocrystal such as a zinc sulfide core with a manganese selenide shell. Accordingly, in one example embodiment, component 86a may be a light-activated quantum dot, component 86b may be a light-activated molecule, component 86c may be nanocrystal, and a component 86d may be a nanoparticle. Such a complex ink, which may result in a complex spectral information pattern 16, would be very difficult to duplicate or counterfeit.

Other variations and modifications of the concepts described herein may be utilized and fall within the scope of the claims below.

We claim:

1. An ink including light-activated components utilized for printing a security mark, comprising:
   a first ink component that defines a first spectral property, the first component being chosen from a nanocrystal, a quantum dot, and a carbon nanotube;
   a second ink component that defines a second spectral property different from said first spectral property, the second component being chosen from a nanocrystal, a quantum dot, and a carbon nanotube; and
   a solvent in which said first and second ink components are dispersed;
   wherein the first and second spectral properties are each a wavelength specific feature chosen from the group consisting of an absorptive feature and a Raman feature.

2. The ink of claim 1 wherein said ink is adapted to be read by a spectroscopic decoding system that reads said first and said second spectral properties.

3. The ink of claim 1 wherein said first spectral property defines a first wavelength peak location and a first wavelength peak intensity, and wherein said second spectral property defines a second wavelength peak location different from said first wavelength peak location and a second wavelength peak intensity.

4. The ink of claim 1 wherein at least one of said first and second spectral properties defines a spectral property in a non-visible wavelength range.

5. The ink of claim 1 wherein said first and said second ink components are each activated by optical stimulation and wherein said first and said second ink components are each selectively readable when optically stimulated.

6. The ink of claim 1 wherein said first spectral property defines a first wavelength peak width, and wherein said second spectral property defines a second wavelength peak width.

7. A method of reading a security mark, comprising:
   printing an ink on a surface of a security item to form the security mark, the ink including:
      a first ink component that defines a first spectral property, the first component being chosen from a nanocrystal, a quantum dot, and a carbon nanotube;
      a second ink component that defines a second spectral property different from said first spectral property, the second component being chosen from a nanocrystal, a quantum dot, and a carbon nanotube; and
      a solvent in which said first and second ink components are dispersed;
   emitting a light in a non-visible wavelength range onto the security mark to activate the first and second ink components of said mark, wherein the first and second spectral properties are each a wavelength specific feature chosen from the group consisting of an absorptive feature and a Raman feature;
   detecting a light-activated response from said first and second ink components; and
   comparing said light-activated response with a security pattern stored in a memory.

8. The method of claim 7 wherein said light is chosen from the group consisting of ultraviolet light and infrared light.

9. The method of claim 7 wherein said detecting is conducted with a device chosen from the group consisting of a spectroscopic device.

10. The method of claim 7 wherein said comparing comprises utilizing a computer algorithm to compare a pre-established reference wavelength peak pattern stored in said memory with a wavelength peak response pattern of said light-activated response.

11. The method of claim 10 wherein said wavelength peak standard pattern includes a plurality of standard peaks each having a standard peak position and a standard peak amplitude, wherein said wavelength peak response pattern of said light-activated response includes a plurality of response peaks each having a response peak position and a response peak amplitude, and wherein a position of each of said response peak positions and an amplitude of each of said response peak amplitudes is compared with a position of said standard peak positions and an amplitude of said standard peak amplitudes, respectfully, for corresponding ones of said standard peaks.

12. The method of claim 11 wherein said response pattern is determined to match said standard pattern when each of said response peak positions match a corresponding standard peak position to within ten percent of a value of said standard peak position, and when each of said response peak amplitudes match a corresponding standard peak amplitude to within ten percent of a value of said standard peak amplitude.

13. A method of printing a security mark, comprising:
   printing an ink on a surface of a security item to form a security mark, the ink comprising:
      a first ink component that defines a first spectral property, the first component being chosen from a nanocrystal, a quantum dot, and a carbon nanotube;
      a second ink component that defines a second spectral property different from said first spectral property, the second component being chosen from a nanocrystal, a quantum dot, and a carbon nanotube; and
      a solvent in which said first and second ink components are dispersed;
   wherein said security mark defines a barcode, said barcode including a plurality of light-active barcode elements, each barcode element defining an element location, wherein said element location of each barcode element is different from one another;
   and wherein each of said first and second ink components defines a spectral property chosen from the group consisting of an absorptive feature and Raman feature.

14. The method of claim 13 wherein said element location of each of said light-active barcode elements comprises a wavelength peak location along a light wavelength spectrum.

15. The method of claim 13 wherein said printing comprises inkjet printing of the ink on said surface of said security item, and wherein the first and second ink components define a corresponding one of each of said light-active barcode elements.

16. The method of claim 13 wherein said printing comprises inkjet printing of the ink on said surface of said security item, and wherein a quantity of each of said first and second ink components in said ink defines an element amplitude of a corresponding one of each of said light-active barcode elements.

17. The method of claim 13 wherein said light-active barcode elements are light-active when stimulated by light having a wavelength outside the visible wavelength range.

18. The method of claim 13 wherein said light-active barcode elements define a pattern that uniquely identifies components of an ink utilized to print said security mark.

19. A security mark, comprising:
  light activated barcode elements formed from an ink, the ink comprising:
    a first ink component that defines a first spectral property, the first ink component being chosen from a nanocrystal, a quantum dot, and a carbon nanotube;
    a second ink component that defines a second spectral property different from the first spectral property, the second ink component being chosen from a nanocrystal, a quantum dot, and a carbon nanotube; and
    a solvent in which the first and second ink components are dispersed;
  wherein emission spectral information of the light activated barcode elements define a fingerprint;
  and wherein the first and second spectral properties are each a wavelength specific feature chosen from the group consisting of an absorptive feature and a Raman feature.

* * * * *